Patented Mar. 24, 1953

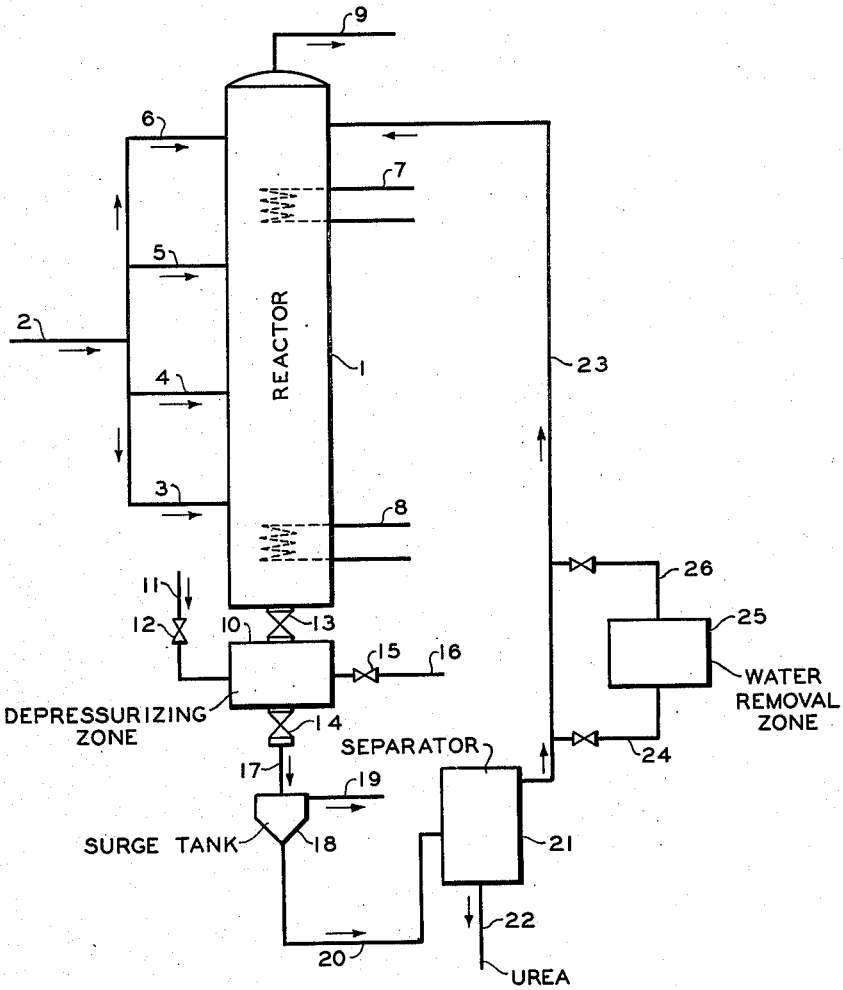

2,632,771

UNITED STATES PATENT OFFICE 2,632,771

UREA SYNTHESIS

Donald H. White, Bartlesville, Okla., assignor to Phillips Petroleum Company, a corporation of Delaware Application November 7, 1949, Serial No. 125,967

9 Claims. (Cl. 260—555)

This invention relates to the synthesis of urea. In a specific aspect this invention relates to a novel method for withdrawing urea from a reactor for the synthesis of urea. In another specific aspect this invention relates to a novel method for effecting the synthesis of urea wherein the urea is formed and crystallized in the same reactor.

Urea is produced by the interaction of ammonia and carbon dioxide or compounds thereof, with or without water and with or without dehydrating agents, at high temperatures and pressures within a closed vessel. A melt is produced which is highly corrosive in nature and which is characterized by a relatively high autogenously developed pressure. In the past, difficulty has been encountered in removing the melt from the reactor. Valves have been employed to exercise control over the high pressure, but the high temperature and pressure of the melt causes rapid corrosion and erosion of the valves. The cost of replacement parts and of operational shut-downs attendant therewith are undesirable economically, and it is an object of this invention to provide a method wherein the corrosion problem is at least partially eliminated.

Further, the temperature employed for the synthesis of urea is sufficient to maintain the urea in a liquid state, and to separate the urea from the synthesis melt it is ordinarily necessary to remove the entire melt from the reactor to separating means where the urea is permitted to crystallize. It is another object of the invention to effect urea synthesis process in such a manner that urea is both formed and crystallized in the same reactor.

Further and additional objects of my invention will be readily apparent from the disclosure hereinbelow and from the accompanying drawing.

I have found that urea crystals can be formed in a urea synthesis reactor by operating a portion of the reactor at a temperature suitable for the synthesis and by operating another portion of the reactor at a temperature below that at which the urea crystallizes. I have also found that, by withdrawing the urea crystals from the reactor at a temperature suitable for the formation of urea crystals through a valve across which there is only a relatively small or no pressure differential, the corrosion and erosion of the valve can be markedly reduced.

The figure is a diagrammatic representation of one method of practicing my invention. Such conventional equipment as pumps, compressors, and the like have not been included in the accompanying drawing, but the inclusion of such equipment is believed to be well within the scope of my invention.

In practicing my invention, urea is formed from ammonia and carbon dioxide in a high pressure reactor or autoclave at conditions similar to those practiced in the art. For example, the reaction may be effected at a temperature of 300 to 400° F., preferably 340 to 400° F., at the autogenous pressure of the synthesis. This pressure may vary from 1700 to 3500 pounds per square inch absolute, but pressures above the autogenous pressure and as high as 8,000 pounds per square inch absolute may be employed. The reactor is preferably a vertically elongated autoclave, and it is so constructed that the upper portion of the reactor contents is maintained at a temperature within the above-named ranges. The lower portion of the reactor contents is maintained at a temperature below the melting point of urea (132.7° C. 278.6° F.), preferably at a temperature below 140° F., and more preferably at a temperature within the range of 100 to 120° F. At these operating conditions a thick slurry containing urea forms in the lower portion of the reactor. The thick slurry is withdrawn from the lower portion of the reactor, and, since the temperature of this slurry is considerably lower than the urea synthesis temperature, the corrosive character of the withdrawn slurry is considerably less than a urea synthesis melt at synthesis conditions. My process is a marked improvement over prior art processes, since in those processes the synthesis melt is withdrawn from the reactor at the synthesis temperature, and, if it is desired to remove the melt from the reactor at a temperature lower than the synthesis temperature, it is necessary to cool the entire melt prior to removal from the reactor.

In addition to employing a novel method for producing urea, I also employ a novel method for removing the urea from the synthesis reactor which advantageously utilizes an arrangement of valves similar to that shown in the accompanying drawing. The pressure of the urea-containing slurry in the lower portion of the reactor is still at the pressure employed for the synthesis reaction which is usually at least as high as the autogenous pressure developed by the melt. To remove the synthesis melt from the reactor for separation of the urea presents a perplexing problem, and prior art processes have employed pressure reducing conduits for this removal, However, in my process I remove the urea-containing slurry from the reactor through a valve which is constructed to withstand the high synthesis reaction pressure into a depressurizing zone which is at substantially the same pressure as the synthesis reaction pressure. After the urea-containing slurry has been removed from the reactor, the valve is closed, and the pressure on the slurry is reduced to about atmospheric pressure. The urea is then readily removed from the system without a large differential pressure across an open valve.

Referring to the figure, reactor 1 is usually a lead- or silver-lined, vertically elongated reaction chamber or autoclave operated at a pressure of 1700 pounds per square inch for the synthesis of urea. Liquid ammonia and liquid carbon dioxide are introduced to the system via line 2, and mixtures of the two reactants are introduced to reactor 1 multipointwise via lines 3, 4, 5 and 6. The reactants may enter the reactor at only a single point, but multipoint injection is preferred since the injection of reactants at various points in the reactor serves as a means for obtaining better temperature control of the reaction mixture and easier heat removal from the reaction mixture. The ammonia and carbon dioxide are usually employed in the reactor in a molar ratio of 2:1 to 4:1, but higher molar ratios, for example 10:1 and higher, may be employed. The overall net reaction taking place in reactor 1 is exothermic, and the reaction temperature can be controlled to some extent by using suitable temperatures of the influent reactants. However, in addition to controlling the temperature in this manner, exothermic heat of reaction can be dissipated by circulating a suitable liquid coolant, such as normally liquid hydrocarbons or water, through cooling tube or conduit 7. The upper portion of the reactor is thus maintained at a temperature within the range of 300 to 400° F. The lower portion of reactor 1 is also provided with cooling tube or conduit 8 through which a liquid coolant similar to that employed in cooling tube 7 is circulated. Cooling tube 8 cools the lower portion of reactor 1 to a temperature sufficiently low to permit the formation of urea crystals. The preferred temperature is within the range of 100 to 120° F. The urea crystals form a slurry in the lower portion of reactor 1, and they are withdrawn as described hereinbelow.

Instead of employing cooling tubes for maintaining the desired temperature levels in reactor 1, the reactor may be jacketed, and suitable liquid coolants are then employed in the jackets surrounding the reactor to remove excess exothermic heat of reaction.

The proportionate volume of the total volume of the contents of reactor 1 that is maintained at a temperature sufficiently low to effect the crystallization of urea is dependent primarily upon the design of the reactor. In the figure cooling tube 8 would maintain about 25 volume per cent of contents of reactor 1 at a temperature sufficient to cause urea crystallization and about 75 volume per cent of the contents are maintained at a higher temperature, but this proportion is subject to variation. Ordinarily, at least 50 volume per cent of the reaction mixture is maintained at a temperature above the urea crystallization temperature, and no more than 50 volume per cent of the reaction mixture is maintained at a temperature sufficient to cause crystallization of urea. Preferably, from 50 to 90 volume per cent of the reaction mixture is at the higher temperature and from 10 to 50 volume per cent is at the lower temperature.

In order to prevent the accumulation of gases, particularly inert gases, in reactor 1, gases therein are withdrawn via line 9. The gas thus removed from the system contains, in addition to gaseous ammonia and carbon dioxide, inert gases that entered the system with the reactants via line 2. Typical examples of the inert gases are nitrogen and hydrogen and small amounts of the inert gases found in air. The gas passing via line 9 may be discarded but it may be economically desirable to separate the ammonia and carbon dioxide for recycling to reactor 1 by means not shown. Also, a small portion of this gas may be employed, as described hereinbelow, in depressuring zone 10.

As a preliminary to the removal of the urea-containing slurry from reactor 1, the pressure in depressurizing zone 10 is raised to not more than 10 to 30 pounds per square inch lower than the pressure in reactor 1. This increase in pressure is effected by introducing a gas under pressure via line 11 and valve 12 while keeping valves 13, 14 and 15 in a closed position. The gas that is employed to effect this pressure increase may be a small amount, say 0.5 to 5.0 volume per cent, of the gas that is removed from reactor 1 via line 9. Also, this gas may be one of the urea synthesis reactants, such as carbon dioxide, or it may be an inert gas, such as nitrogen or hydrogen, that has been compressed to the desired pressure. After the desired pressure has been attained in depressurizing zone 10, valve 12 is closed and valve 13 is opened permitting the passage of urea-containing slurry therethrough. Subsequently, valve 13 is closed and the pressure in zone 10 is reduced to about atmospheric pressure by opening valve 15 in line 16 which is above the liquid level in the depressurizing zone. The gas that is emitted from zone 10 via line 16 contains gas that was employed to build up the pressure in zone 10 along with gaseous ammonia and carbon dioxide, and the gas passing via line 16 may be sent to a suitable recovery step (not shown) to recover the ammonia and carbon dioxide for use in reactor 1. After zone 10 has been depressurized, valve 14 is opened and the urea-containing slurry passes via line 17 to surge tank 18. From tank 18 a gas is vented via line 19, and, since this gas contains ammonia and carbon dioxide resulting from the decomposition of ammonium carbamate this gas may also be passed to suitable means (not shown) for recovery of the ammonia and carbon dioxide for use in reactor 1.

From surge tank 18 urea-containing slurry passes via line 20 to separating means 21, which may be a centrifuge, a filter press or other suitable means for separating the urea crystals from the mother liquor. Urea is withdrawn from separator 21 via line 22, and mother liquor containing water and ammonium carbamate are returned to reactor 1 via line 23. In order to prevent the excessive accumulation of water in reactor 1, a portion of the mother liquor passing via line 23 is withdrawn via line 24 and passed to water removal zone 25, which may be an evaporator or other suitable means for removing water. Mother liquor having a decreased water content passes from zone 25 via line 26, and it is returned to reactor 1 via line 23.

From the above disclosure modifications of my process within the scope of my invention will be apparent to those skilled in the art. For example, it is within the scope of my invention to employ in the urea synthesis melt such corrosion inhibitors as sodium dichromate, potassium permanganate and polyvalent metals, such as copper, bismuth, chromium, nickel, molybdenum. Other modifications of my invention will also be readily manifest.

I claim:

1. In a process wherein urea is being formed by the interaction of ammonia and carbon dioxide at an elevated temperature and pressure, the improvement which comprises maintaining the upper portion of the reaction mixture at an elevated temperature suitable for the synthesis reaction, maintaining the remaining lower portion of the reaction mixture at a temperature below the crystallization point of urea, and during the reaction withdrawing from said lower portion of the reaction mixture solid urea, ammonium carbamate and water, separating the solid urea from the mother liquor, separating said liquor into two portions one of which is treated to remove water and directly recycling the other portion to the reaction without decomposition of the ammonium carbamate therein contained.

2. In a process wherein urea is being formed by the interaction of ammonia and carbon dioxide at an elevated temperature and pressure, the improvement which comprises maintaining at least 50 volume per cent of the reaction mixture at a temperature within the range of 300 to 400° F., maintaining no more than 50 volume per cent of the reaction mixture at a temperature below 140° F., and during the reaction withdrawing from the cooler portion of the reaction mixture solid urea, ammonium carbamate and water, separating the solid urea from the mother liquor, separating said liquor into two portions, one of which is treated to remove water and directly recycling the other portion to the reaction without decomposition of the ammonium carbamate therein contained.

3. An improvement according to claim 2 wherein from 50 to 90 volume per cent of the reaction mixture is maintained at a temperature within the range of 340 to 400° F.

4. An improvement according to claim 2 wherein from 10 to 50 volume per cent of the reaction mixture is maintained at a temperature within the range of 100 to 120° F.

5. In a process wherein urea is being formed by the interaction of ammonia and carbon dioxide at an elevated temperature and pressure, the improvement which comprises maintaining the upper portion, at least 50 volume per cent, of the reaction mixture at a temperature within the range of 340 to 400° F., maintaining the lower portion, no more than 50 volume per cent, of the reaction mixture at a temperature below 140° F., during the reaction withdrawing a urea-containing slurry from the cooler portion of the reaction mixture into a depressurizing zone at a pressure not substantially lower than the pressure of the reaction mixture, reducing the pressure on the thus-withdrawn slurry, recovering solid urea from said slurry to obtain a motor liquor containing ammonium carbamate and water, separating said liquor into two portions, one of which is treated to remove water and directly recycling the other portion to the reaction without decomposition of the ammonium carbamate therein contained.

6. An improvement according to claim 5 wherein the pressure in the depressurizing zone into which the urea-containing slurry is withdrawn is not more than 30 pounds per square inch lower than the pressure of the reaction mixture.

7. An improvement according to claim 5 wherein the interaction of ammonia and carbon dioxide is effected at the autogenous pressure of the reaction mixture and wherein the pressure in the depressurizing zone into which the urea-containing slurry is withdrawn is equal to said autogenous pressure prior to reduction of the pressure on said slurry.

8. An improvement according to claim 5 wherein the pressure on the urea-containing slurry is reduced to atmospheric pressure in the depressurizing zone.

9. An improvement according to claim 5 wherein liquid from the solid urea recovery step is recirculated to the reaction mixture.

DONALD H. WHITE.

REFERENCES CITED

The following references are of record in the file of this patent:

UNITED STATES PATENTS

| Number | Name | Date |
|---|---|---|
| 1,670,341 | Casale | May 22, 1928 |
| 1,782,723 | Hetherington et al. | Nov. 25, 1930 |
| 2,038,564 | Hetherington et al. | Apr. 28, 1936 |

FOREIGN PATENTS

| Number | Country | Date |
|---|---|---|
| 397,681 | Germany | July 1, 1924 |